United States Patent
Lecomte et al.

(10) Patent No.: US 6,872,368 B2
(45) Date of Patent: Mar. 29, 2005

(54) METHOD AND DEVICE FOR PROCESSING A GAS CONTAINING HYDROGEN SULFIDE AND SULFUR DIOXIDE COMPRISING A STAGE OF REMOVAL OF BY-PRODUCTS

(75) Inventors: Fabrice Lecomte, rue Henri Dunant (FR); Christian Streicher, rue Masséna (FR); Cécile Barrere-Tricca, avenue du Trône (FR)

(73) Assignee: Institut Francais du Petrole, Rueil-Malmaison cedex (FR)

(*) Notice: Subject to any disclaimer, the term of this patent is extended or adjusted under 35 U.S.C. 154(b) by 645 days.

(21) Appl. No.: 09/902,104

(22) Filed: Jul. 11, 2001

(65) Prior Publication Data
US 2001/0055549 A1 Dec. 27, 2001

Related U.S. Application Data

(62) Division of application No. 09/444,847, filed on Nov. 22, 1999, now Pat. No. 6,280,698.

(30) Foreign Application Priority Data

Nov. 20, 1998 (FR) .................................... EN 98/14674

(51) Int. Cl.⁷ ................................................ B01J 8/00
(52) U.S. Cl. ...................... 422/235; 422/198; 422/211
(58) Field of Search .............................. 422/168–171, 422/177, 188, 190, 211, 222, 234, 235, 181, 198; 423/574.1, 575, 576.2, 242.1, 242.2, 222, 226

(56) References Cited

U.S. PATENT DOCUMENTS

| | | | | |
|---|---|---|---|---|
| 4,387,037 A | * | 6/1983 | Trentham et al. | 252/184 |
| 5,389,351 A | * | 2/1995 | Hasebe et al. | 423/242.1 |
| 5,935,547 A | * | 8/1999 | LeComte et al. | 423/575 |
| 5,951,961 A | * | 9/1999 | Viltard et al. | 423/575 |
| 6,413,488 B1 | * | 7/2002 | Smith et al. | 423/574.1 |

* cited by examiner

*Primary Examiner*—Kiley S. Stoner
*Assistant Examiner*—Kevin McHenry
(74) *Attorney, Agent, or Firm*—Antonelli, Terry, Stout & Kraus, LLP

(57) ABSTRACT

A method for processing a gas containing at least hydrogen sulfide ($H_2S$) and at least sulfur dioxide ($SO_2$), includes the steps of contacting the gas with a liquid solvent containing at least one catalyst in a contacting stage, recovering gaseous effluent substantially containing no hydrogen sulfide and no sulfur dioxide from the contacting stage, and separating liquid sulfur from liquid solvent in a decantation zone downstream of the contacting stage. In order to remove by-products resulting from degradation of the catalyst, a liquid fraction F containing at least solvent, catalyst, sulfur and the solid by-products resulting from degradation of the catalyst is extracted from after the contacting stage. The liquid fraction F is sent to a processing stage distinct from the contacting stage where the liquid fraction F is heated to a temperature at least partially crystallizing the by-products, and the at least partially crystallized by-products separated from the rest of the liquid fraction F containing at least solvent. At least a stream $F_1$ comprising solvent, catalyst and sulfur and substantially free of the by-products and a stream $F_2$ mostly comprising the by-products are recovered.

8 Claims, 2 Drawing Sheets

METHOD AND DEVICE FOR PROCESSING A GAS CONTAINING HYDROGEN SULFIDE AND SULFUR DIOXIDE COMPRISING A STAGE OF REMOVAL OF BY-PRODUCTS

This is a divsional application of U.S. Ser. No. 09/444,847, filed Nov. 22, 1999 now U.S. Pat. No. 6,280,698.

FIELD OF THE INVENTION

The object of the present invention is a method for processing, by means of an organic solvent containing at least one catalyst, a gaseous effluent containing at least hydrogen sulfide and sulfur dioxide, during which most of the by-products formed during said treating process is removed.

The by-product removal stage, or processing stage, is notably carried out at a temperature allowing formation and growth of the crystals of these by-products, i.e. crystallization of these by-products.

The method according to the invention is for example applied in Clauspol processing units used after the Claus process.

BACKGROUND OF THE INVENTION

The Claus process is widely used, notably in refineries (after hydrodesulfurization or catalytic cracking units) and for processing of natural gas, to recover elemental sulfur from gaseous feeds containing hydrogen sulfide. However, the fumes produced by Claus plants contain, even after several catalytic stages, appreciable amounts of acid gases. It is then necessary to process these Claus plant effluents (tail gas) to remove most of the toxic compounds so as to abide by antipollution standards.

It is for example well-known to recover about 95% by weight of the sulfur present from a Claus plant.

Processing this Claus plant effluent with a Clauspol plant allows for example to reach 99.8% by weight of solvent recovered, from the exothermic Claus reaction:

$$2H_2S + SO_2 \leftrightarrow 3S + 2H_2O \quad \text{(reaction 1)}$$

Such processing requires a reaction medium consisting of an organic solvent and at least one catalyst comprising an alkaline or alkaline-earth salt of an organic acid. Contacting the gas to be processed and the organic solvent containing the catalyst is carried out in a gas-liquid contactor reactor whose temperature is controlled by passage of the solvent, that has been extracted from the contactor reactor by a circulation pump, into a heat exchanger so as to favour the highest sulfur conversion coefficient while preventing formation of solid sulfur. It is well-known that, in this type of plant, the solvent that has a limited capacity for dissolving elemental sulfur becomes loaded with free liquid elemental sulfur that can be separated from the solvent by simple decantation. This liquid sulfur—solvent decantation is carried out in a liquid-liquid decantation zone that can be situated at the bottom of the contactor reactor. The sulfur is thus recovered in liquid form.

Operation of such a plant is for example described in one of the following reference books:

Y. BARTHEL, H. GRUHIER, The IFP Clauspol 1500 process: eight years of industrial experience, Chem. Eng. Monogr., 10 (Large Chem. Plants), 1979, pp.69–86;

HENNICO A., BARTHEL Y., BENAYOUN D., DEZAEL C., Clauspol 300: the new IFP TGT process, For presentation at AIChE Summer National Meeting, Denver (Colo.), Aug. 14–17, 1994.

It is furthermore well-known that the desulfurization rate of a plant of this type can be improved by desaturating the solvent in sulfur in a desaturation loop according to a process described in patent FR-2,735,460 filed by the applicant. In this case, part of the single-phase solvent and sulfur solution extracted at the end of the contactor reactor is cooled in order to crystallize the sulfur. This crystallized sulfur is then separated from the solvent by various known solid-liquid separation means such as filtration, decantation or centrifugation. A sulfur-depleted solvent that can be recycled to the contactor reactor is obtained on the one hand, and a suspension enriched in solid sulfur that can be reheated to melt the sulfur, then sent to a solvent-sulfur liquid-liquid decantation zone where the liquid sulfur is recovered is obtained on the other hand.

Although such a method proves to be effective, it can however be limited.

For example, side reactions occur in the contactor reactor, leading to formation of by-products, mainly salts such as alkaline or alkaline-earth sulfates or thiosulfates, due for example to the slow degradation of the catalyst. These by-products tend to accumulate in the decantation zone at the interface between the organic solvent and the liquid sulfur, which makes decantation of the liquid sulfur difficult.

One way allowing to overcome this problem is described in patent FR-2,735,460, which discloses the possibility of passing a solvent containing such salts through a filter. The salts settle on the filter, and the sulfur-containing solvent is sent to a sulfur-desaturation stage. On the one hand, such processing of the circulating solvent is not sufficient to entirely remove any accumulation of these salts at the liquid sulfur-solvent interface, including the liquid sulfur-solvent decantation zone situated downstream from the zone intended for sulfur desaturation of the solvent. On the other hand, if the solvent is not desaturated in sulfur by means of a desaturation loop, sulfur might be co-eliminated with the solid salts, so that processing of the fluid resulting from regeneration of the filter will be delicate.

SUMMARY OF THE INVENTION

The object of the present invention is a method and its associated device, wherein a solution extracted from the contactor reactor and containing at least solvent, catalyst, sulfur and by-products is subjected to at least one heating stage and to at least one separation stage so as to remove most of the by-products it contains and to obtain a solvent practically free of said by-products.

These by-products are for example the result of the slow degradation of the catalyst.

It has been observed that heating the fluid extracted from the contactor reactor and containing at least solvent, catalyst, sulfur and by-products to a suitable temperature:

favours crystallization of the by-products in solution in the solvent, which facilitates removal of said by-products, causes solubilization of the free sulfur droplets possibly present in the solvent, which prevents co-elimination of sulfur with the by-products and facilitates the possible processing of the fluid resulting from regeneration of elements in the processing zone.

The solvent practically free of by-products can be advantageously recycled, partly or totally, to the contactor reactor where the gas is processed.

The invention relates to a method for processing a gas containing at least hydrogen sulfide ($H_2S$) and at least sulfur dioxide ($SO_2$), wherein said gas is contacted, at a suitable temperature, with an organic solvent containing at least one catalyst, a gaseous effluent substantially containing no hydrogen sulfide and no sulfur dioxide any more is recovered, as well as liquid sulfur separated from the solvent by liquid-liquid decantation.

It is characterized in that:

a fluid F containing at least solvent, catalyst, sulfur and by-products is extracted after the contacting stage, said fluid F is sent to a processing stage comprising at least one heating stage during which said fluid F is brought to a determined temperature favouring crystallization of the by-products, and to a stage of separation of the by-products from the solvent, after the processing stage, at least a stream $F_1$ comprising mainly solvent, catalyst and sulfur and nearly free of by-products and a stream $F_2$ comprising most of the by-products are recovered.

Fluid F is for example a liquid single-phase solution.

The by-products contained in fluid F can be dissolved and/or crystallized.

The temperature to which said fluid F is brought ranges for example between 120 and 180° C., preferably between 120 and 150° C.

The processing stage is for example carried out by implementing at least one of the following procedures:

a) carrying out at least one filtering stage so as to recover said fluid $F_1$ mainly consisting of solvent depleted in solid by-products and said fluid $F_2$ resulting from regeneration of the filtering support and containing most of the by-products, and/or b) carrying out at least one stage of capture, on a solid support, of the by-products so as to recover at least said fluid $F_1$ mainly consisting of solvent depleted in by-products and said fluid $F_2$ resulting from regeneration of the solid support and containing most of the by-products.

Procedures a) and b) can be carried out at a temperature ranging between 120 and 180° C., preferably between 120 and 150° C.

Fluid $F_1$ resulting from the processing stage can be recycled, partly or totally, to the contacting stage.

The invention also relates to a device allowing to remove and to recover by-products formed during a process for treating a gaseous effluent containing at least hydrogen sulfide ($H_2S$) and sulfur dioxide ($SO_2$) wherein a solvent and at least one catalyst are used, said device comprising at least one contactor reactor, at least one decantation zone, several lines for delivery of at least the gas to be processed, of the solvent and of the catalyst, several lines for extraction of at least a cleaned gas and of a fluid containing at least solvent, catalyst, sulfur and by-products.

It is characterized in that it comprises at least one zone for processing said fluid comprising at least solvent, catalyst, sulfur and by-products, said processing zone including heating means suited to favour crystallization of the by-products and by-products—solvent separation means. At the outlet of the processing zone, at least a fluid $F_1$ mainly consisting of solvent, catalyst and sulfur and nearly free of by-products and a fluid $F_2$ containing most of the by-products are recovered.

The heating means are operated for example between 120 and 180° C., preferably between 120 and 150° C.

According to an embodiment, the decantation zone is situated in the lower part of said contactor reactor.

The processing zone can comprise at least one of the separation means selected from the following means:

filtering means, said means being suited to produce at least fluid $F_1$ mainly consisting of solvent and at least fluid $F_2$ containing most of the by-products formed, and/or capture means such as metals, activated charcoals, zeolites, resins, aluminas, silicas or ceramics, said means being suited to produce at least fluid $F_1$ mainly consisting of solvent and at least fluid $F_2$ containing most of the by-products formed.

The device can comprise a line allowing to recycle at least part of the solvent coming from the processing stage, or fluid $F_1$, to the contactor reactor.

The contactor reactor is for example selected from one of the devices mentioned in the following list: reactor with random or stacked packing or static mixer SMV or impactor or hydro-ejector or atomizer or wire contactor.

The method and the device according to the invention are for example applied for processing effluents from Claus plants processing the $H_2S$ coming from natural gas scrubbing operations or from crude oil refining operations.

The method and its associated device notably afford the following advantages:

they allow to prevent problems of decantation of the liquid sulfur in the liquid-liquid decantation zone, they allow to prevent accumulation of solid by-products in the packings provided in certain contactor reactor types, they allow to simply improve existing Clauspol plants by mere addition of a small number of equipments and therefore at a low cost, they allow to recover a cleaned solvent and to recycle it directly to the gas treating process.

BRIEF DESCRIPTION OF THE DRAWINGS

Other features and advantages of the invention will be clear from reading the description hereafter of several embodiments of the method, with reference to the accompanying simplified and non limitative drawings wherein.

DETAILED DESCRIPTION OF THE INVENTION

The embodiments given hereafter by way of non limitative example relate to the removal of the by-products formed during processing of a gas containing at least hydrogen sulfide and sulfur dioxide. These by-products are notably due to the slow degradation of the catalyst used in the gas treating process.

Figure 1:
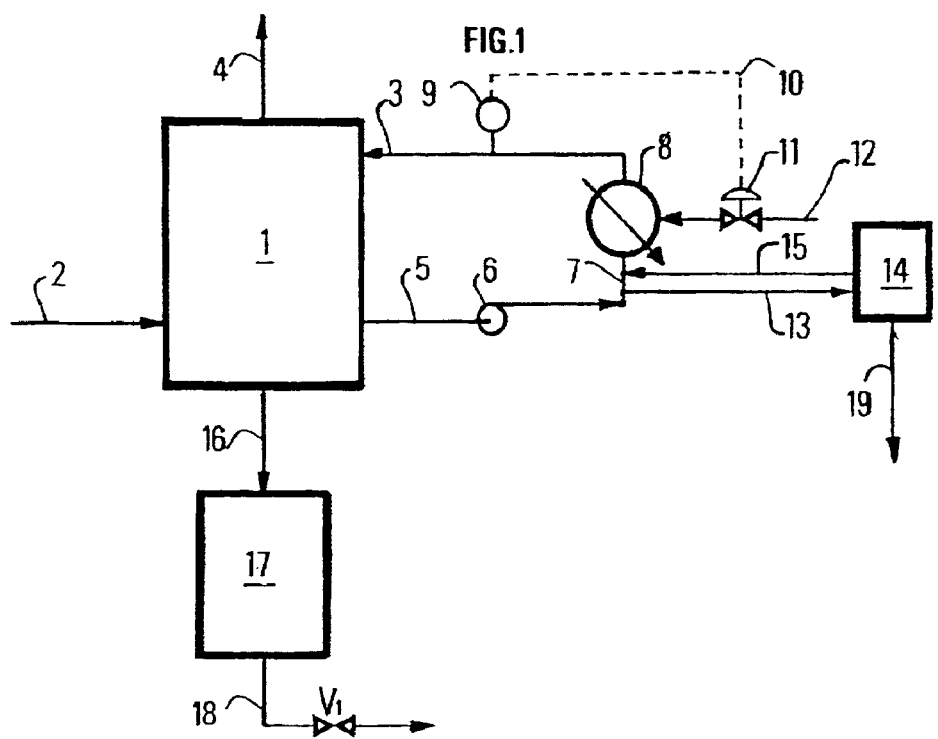
FIG. 1 is a block diagram of the various elements that constitute the device according to the invention, notably the processing zone.

According to FIG. 1, the device comprises a gas-liquid contactor reactor 1. A line 2 supplies the contactor reactor with a sulfur-containing gas feed, for example an effluent from a Claus plant, and a line 3 delivers for example a recycled solution comprising a solvent such as polyethylene glycol 400 and a catalyst such as sodium salicylate.

Various solvents and catalysts selected from the list given in the description hereafter can be used without departing from the scope of the invention.

The cleaned gas is discharged through a line 4.

A fluid F such as a solvent solution containing at least catalyst, sulfur and by-products formed is discharged from contactor reactor 1 through a line 5. This solution is then sent through a pump 6 and lines 7 and 13 to a processing zone 14 where it is freed of most of the by-products. Processing zone 14 comprises at least heating means and separation means some of which are shown in detail in FIGS. 3 and 4. The heating means are suited to obtain a temperature favouring crystallization of the by-products in solution in the solvent. Any device known to the man skilled in the art and allowing to obtain and to work at this temperature, notably allowing to reach crystallization of the by-products formed as mentioned above can be used.

The means for heating the solvent in the processing zone are suited to work within a temperature range between 120 and 180° C., preferably between 120 and 150° C.

The function of processing zone 14, comprising means (not shown in this figure) for heating the solvent solution and means (not shown in this figure) for separating the by-products from the solvent, is notably to process solution F containing notably solvent, catalyst, sulfur and by-products, in order to obtain at least a fluid $F_2$ containing most of the by-products that is discharged through line 19, and a fluid $F_1$ consisting mainly of solvent practically totally free of by-products, that is for example recycled through line 15 to contactor reactor 1.

Fluid $F_1$, in the form of a liquid single-phase solution nearly free of by-products, is sent through lines 15 and 7 into a heat exchanger 8 where it is cooled to a suitable temperature compatible with operation of contactor reactor 1, 120° C. for example. This temperature can be controlled by means of a regulator 9 connected to heat exchanger 8 by a line 10. Line 10 is for example connected to a valve 11 with which a line 12 intended for delivery of the coolant in the heat exchanger is equipped. The cooled solvent solution from heat exchanger 8 can be recycled too contactor reaction 1 through line 3.

Fluid $F_2$ comprising most of the by-products and discharged through line 19 is for example diluted in water prior to being sent to water treatment.

The liquid sulfur obtained by decantation is discharged through a line 18 situated in the lower part of decantation zone 17, connected to contactor reactor 1 by a line 16. Line 18 is provided with a valve $V_1$ for example.

the temperature range selected can also allow solubilization of the free sulfur droplets possibly present in the solvent. this has the effect of preventing removal of the sulfur with the by-products formed and of facilitating possible processing of the fluid resulting from regeneration of the elements in the processing zone.

Figure 2:
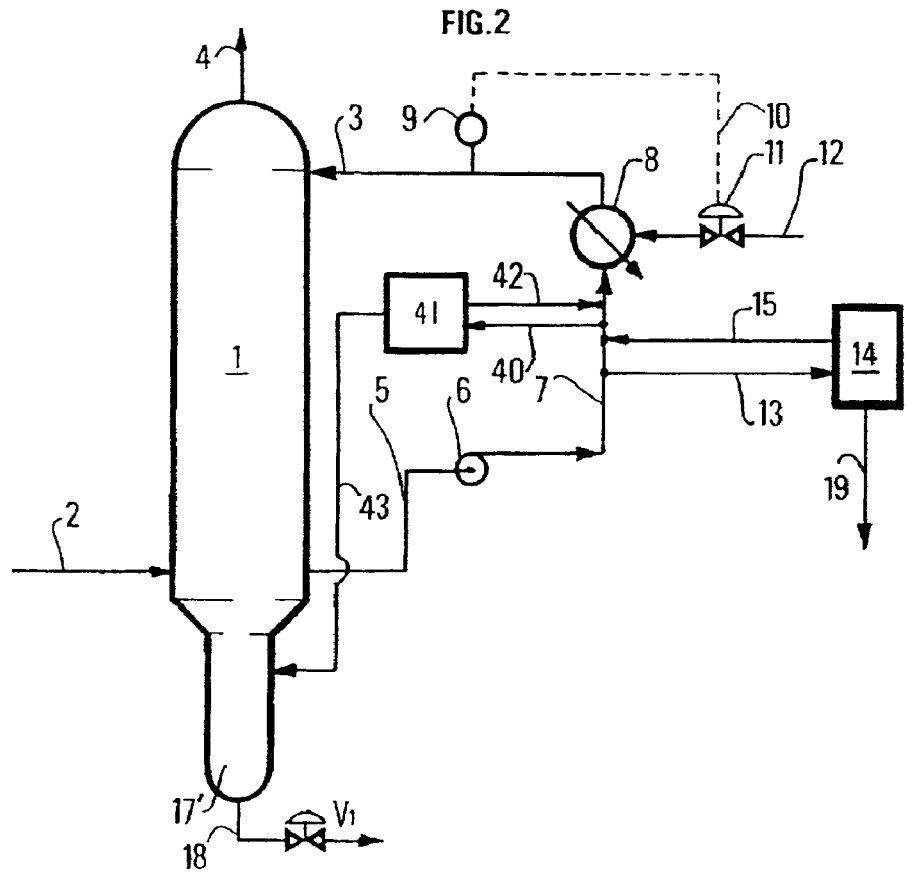
FIG. 2 illustrates a gas processing device comprising a decantation zone situated in the lower part of a contactor reactor, FIG. 3 diagrammatically shows a variant where the processing zone is a filtering zone, FIG. 4 diagrammatically shows a variant where the processing zone is a capture mass.

FIG. 2 diagrammatically shows a realisation variant where the decantation zone is included in contactor reactor 1.

The reference numbers are the same as those used for the identical elements shown in FIG. 1.

The lower part of contactor reactor 1 comprises a decantation zone 17' provided with a liquid sulfur extraction line 18, the line being for example equipped with a valve $V_1$ similar to that shown in FIG. 1.

Part of the single-phase solvent solution that circulates in the recycle loop (notably consisting of elements 5, 6, 7, 8, 3), for example 10 to 20% of the solution, is for example extracted through a line 40, from line 7, in order to be sent to a processing zone such as a zone 41 for desaturating the solvent in sulfur.

In this desaturation zone 41, the single-phase solution is cooled, for example to 60° C., in order to form a suspension of sulfur crystals in the solvent. This crystallized sulfur is then separated from the solvent by means of various solid-liquid separation processes known to the man skilled in the art, such as filtering, decantation or centrifugation. A sulfur-depleted solvent is obtained on the one hand and extracted through a line 42 in order to be recycled for example to contactor reactor 1, and a suspension enriched in solid sulfur is obtained on the other hand. The suspension enriched in solid sulfur can be reheated by appropriate means known to the man skilled in the art in order to melt the sulfur, then sent through a line 43 to the liquid-liquid decantation zone.

In the various realisation variants given in this description, the operating conditions of the process and of the device can be as follows:

Contactor reactor 1 can be operated at a temperature ranging for example between 50 and 130° C., preferably between 120 and 122° C. Said sulfur formed is in the liquid form. The liquid sulfur formed is hardly soluble in the solvent and, because of its higher density, it settles in the bottom of the reactor. The water formed is discharged with the cleaned gas. Under such conditions (low temperature and continuous removal of the products formed), equilibrium (1) is displaced to the right. This temperature is for example controlled by passage of the solvent in heat exchanger 8.

The process can be carried out within a very wide pressure range, 9.8 kPa to 4.9 MPa for example. According to an embodiment, it is carried out at the atmospheric pressure.

The contactor reactor can consist of any equipment or series of equipments allowing contacting of a gas and of a liquid. It can for example be selected from the following list of equipments:

Reactor with random (Intalox saddles for example) or stacked packing (Mellapak type for example) marketed by the Sulzer company for example, Static mixer SMV marketed by the Sulzer company for example, Impactor marketed by the AEA company for example, Hydro-ejector marketed by the Biotrade company for example, Atomizer marketed by the LAB company for example, Wire contactor marketed by the Toussaint Nyssenne company for example.

The solvents commonly used are mono- or poly-alkylene glycols, mono- or poly-alkylene glycol esters or mono- or poly-alkylene glycol ethers, as described in patents FR-2,115,721 (U.S. Pat. No. 3,796,796), FR-2,122,674 and FR-2,138,371 (U.S. Pat. No. 3,832,454).

the catalysts used are selected from those mentioned in these patents and more particularly alkaline salts of weak organic acids such as benzoic acid and salicylic acid.

The concentration of the catalyst in the liquid phase advantageously ranges between 0.1 and 5% by weight, more advantageously between 0.5 and 2% by weight.

The method and the device according to the invention are particularly well-suited for processing a gas whose acid gas content ($H_2S+SO_2$) ranges between 0.1 and 100% by volume. It is however particularly advantageous for gases having a low acid gas content ($H_2S+SO_2$), for example between 0.1 and 50% by volume, and more particularly between 0.5 and 5% by volume.

The separation stage in zone 14 can be performed in various ways, some of which are given hereafter by way of non limitative example.

Filtering Processing

Figure 3:
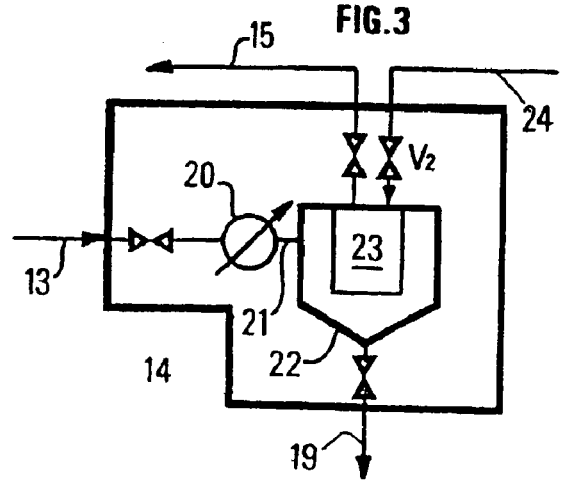

According to a variant illustrated in FIG. 3, processing zone 14 comprises heating means 20 and filtration separation means 22.

The solvent solution F extracted from contactor reactor 1 through line 5 is sent through pump 6 and lines 7 (FIG. 2) and 13 to processing zone 14 comprising a heat exchanger 20 and filtering means, for example one or more filters 22, each consisting for example of at least one deformable cloth filter cartridge 23.

The solution is heated in heat exchanger 20 to a temperature ranging between 120 and 150° C. in order to favour crystallization of the by-products in solution in the solvent and to solubilize the free sulfur droplets possibly present in the solvent. The solution is then passed through line 21 into filter 22 where the solid by-products settle on cartridge 23 whereas the cleaned solvent $F_1$ is extracted through line 15 in order to be recycled to the top of contactor reactor 1.

Clearing of cartridge 23 in order to eliminate the deposited solid by-products is for example performed by isolating filter 22 from the rest of the device and by sending into cartridge 23 a fluid such as filtered solvent or water, introduced at a pressure slightly higher than the atmospheric pressure through a line 24. The clearing operation can be required when the thickness of the cake formed is such that the pressure difference on the filtering cartridge becomes high, for example between 0.1 and 0.4 MPa.

The by-products in solution in the clearing fluid are extracted from the bottom of the filter through a line 19.

The means allowing to isolate processing zone 14 from the rest of the processing circuit are known to the man skilled in the art and are not detailed. They notably include isolating valves $V_2$.

At least a second filter acting as a by-pass filter or parallel to the first one can be provided to ensure continuous filtering of the solvent solution when the first filter is being cleared.

Capture Processing

Figure 4:
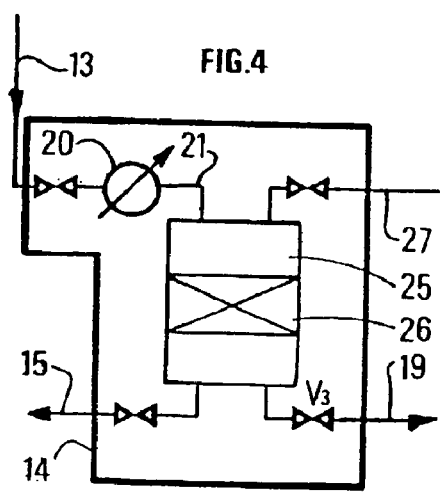

According to a variant illustrated in FIG. 4, separation of the by-products formed is carried out in processing zone 14 by capture on a solid support.

The solvent solution discharged from contactor reactor 1 through line 5 is sent through pump 6 and lines 7 (FIG. 2) and 13 to processing zone 14 comprising a heat exchanger 20 and capture means, for example one or more capacities 25 comprising each one or more capture beds 26. The beds consist of solids, for example metals, activated charcoals, zeolites, resins, aluminas, silicas or ceramics.

The solution is heated in heat exchanger 20 to a temperature ranging between 120 and 150° C. notably in order to favour crystallization of the by-products in solution in the solvent and to solubilize the free sulfur droplets possibly present in the solvent. The solvent solution introduced through line 21 into capacity 25 is passed through collecting bed 26 which traps the by-products. The solvent freed of the most part of the by-products is discharged from capacity 25 through line 15 in order to be recycled to contactor reactor 1.

When the bed is saturated with solid by-products, capacity 25 is isolated from the rest of the device and clean water introduced through a line 27 is for example passed through bed 26. The water is discharged through a line 19, loaded with dissolved by-products. According to the solid support used, saturation can be controlled either by measuring the pressure drop in the bed or by extrapolating saturation curves obtained in the laboratory.

As in the case of filtering, the means allowing to isolate processing zone 14 from the rest of the processing circuit are known to the man skilled in the art and will not be detailed. They notably comprise isolating valves $V_3$.

At least a second capacity acting as a by-pass capacity can be provided to allow continuous capture of the by-products contained in the solvent solution during regeneration or replacement of the bed of the first capacity.

Two numerical examples given hereafter allow to better understand the advantages afforded by the different variants of the method according to the invention.

In these examples, the term "salt" designates the by-products likely to be formed notably by side reactions because of the presence of the catalyst during a gas treating process.

The two examples given differ in their method of separation of the by-products and the solvent. In both cases, the contactor reactor is operated as follows:

A tail gas from a Claus plant is fed through a line 2, at a flow rate of 12300 $Nm^3/h$, into a vertical contactor reactor 1 consisting of a column containing two packing beds, and it is contacted at 125° C. with an organic solvent containing a soluble catalyst introduced through line 3.

The packing used in both examples consists of 2 saddle beds ("Intalox" ceramic saddles 250 $m^2/m^3$ in specific surface).

The organic solvent used is a polyethylene glycol with a molecular mass of 400 and the soluble catalyst is sodium salicylate at a concentration of 100 millimoles/kg solvent.

The solvent is recycled between the bottom and the top of the contactor reactor through lines 5, 7 and 3 at a flow rate of 500 $m^3/h$, by means of circulation pump 6 through a heat exchanger 8, temperature control and regulation being provided by a measuring and control system 9, 10 and 11 allowing hot water to be injected at 80° C. into the exchanger through line 12. The temperature of the recycled solvent is 125° C.

The cleaned gas flows out of the contactor reactor through line 4. The sulfur formed settles at the bottom of the contactor reactor and is extracted through line 18 at a rate of 332 kg/h.

The compositions of the gases flowing into and out of the plant are given in the table hereafter:

| Constituents | Incoming gas (2) % vol. | Outgoing gas (4) % vol. |
|---|---|---|
| $H_2S$ | 1.234 | 0.0586 |
| $SO_2$ | 0.617 | 0.0293 |
| $CO_2$ | 4.000 | 4.038 |
| COS | 0.015 | 0.009 |
| $CS_2$ | 0.015 | 0.009 |
| $S_v$* | 0.14 | 0.03 |
| $N_2$ | 60 | 60.396 |
| $H_2O$ | 34 | 35.384 |
| Sum of the sulfur compounds (counted in sulfur) | 2.036 | 0.1449 |

*$S_v$ = vapour sulfur + liquid sulfur

The sulfur compounds yield in the contactor reactor is:

$$\frac{(\% \text{ incoming sulfur compounds} - \% \text{ outgoing sulfur compounds})}{\% \text{ incoming sulfur compounds}} \times 100 = \frac{(2.036 - 0.1449)}{2.036} \times 100 = 92.9\%$$

The total yield of the 97% yield Claus plant+Clauspol finishing plant is:

$$97 + \frac{(3 \times 92.9)}{100} = 99.8\%$$

The solution F extracted through line 5 is processed by filtering or capture in processing zone 14 according to the two procedures described hereafter.

EXAMPLE 1

(FIGS. 2 and 3): Filtration Separation

Heat exchanger 20 allows to heat the solvent solution to 135° C. and a filter 22 consisting of three 1-m² surface cartridges 23 allows to separate the two fluids $F_1$ and $F_2$. Clearing is performed by isolating processing zone 14 from the rest of the device and by sending water under slight pressure into the cartridges through line 24 when the thickness of the cake exceeds 3 mm, i.e. when the pressure difference on the filtering cartridges becomes greater than 0.2 MPa. After clearing, the salts are recovered in solution in the water at the bottom of the filter and sent to water treatment through line 19. The filter is cleared about every 12 h.

EXAMPLE 3

(FIGS. 2 and 4): Capture Separation

In this example, heat exchanger 20 allows to heat the solvent solution to 135° C. and a capacity 25 containing two 1-m³ salt capture beds 26, each made of a material having a good affinity with the salts to be collected, ceramic saddles for example, allows to separate fluids $F_1$ and $F_2$. After one month of continuous running, the pressure drop becomes higher than 7 kPa, which indicates that the beds are saturated with salts. The processing zone is then isolated from the rest of the device and the capture beds are regenerated by washing with water introduced clean through line 27 and discharged loaded with salts through line 19 prior to being sent to water treatment.

Figure 5:
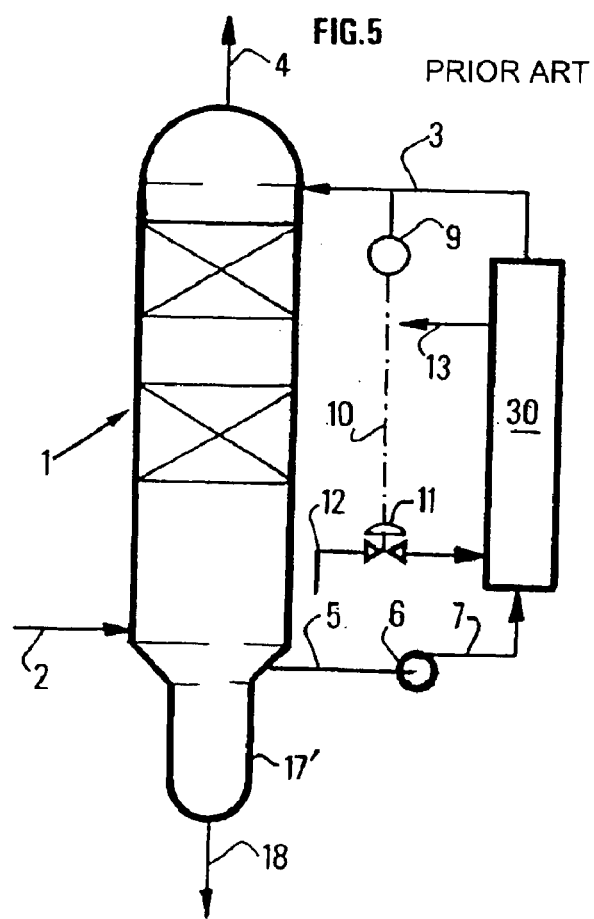
FIG. 5 shows a diagram from the prior art given by way of comparative example.

FIG. 5 diagrammatically shows the process according to the prior art wherein fluid F, or single-phase solution containing mainly solvent, catalyst, sulfur and by-products, is extracted through line 5 and directly sent into a heat exchanger 30 similar to exchanger 8, prior to being recycled to the contactor reactor. Temperature control is performed in the same way as in FIG. 1, with a regulator 9 connected to heat exchanger 30 by a line 10, the coolant being delivered through a line 12 equipped with a valve 11 and discharged through a line 13.

What is claimed is:

1. A device for processing a gaseous effluent containing at least hydrogen sulfide ($H_2S$) and sulfur dioxide ($SO_2$), wherein an organic solvent and at least one catalyst are used, said device comprising:

at least one contactor reactor, at least one decantation zone for separating liquid sulfur from the organic solvent, several lines for delivery of at least a gas to be processed, of a fluid comprising at least solvent and catalyst, several lines for extraction of at least a cleaned gas and of a fluid F containing at least solvent, catalyst, sulfur and by-products resulting from degradation of the catalyst, and at least a processing zone for processing said fluid F comprising at least solvent, catalyst, sulfur and by-products, said processing zone comprising heating means for heating the fluid F to favour crystallization of the by-products and separation means suited for separating the by-products from the rest of said fluid F comprising at least solvent, catalyst and sulfur so as to produce at least a fluid $F_1$ containing mainly solvent, catalyst and sulfur and nearly free of by-products and a fluid $F_2$ comprising most of the by-products.

2. A device as claimed in claim 1, characterized in that the heating means comprises means for heating the fluid F to a temperature between 120 and 180° C.

3. A device as claimed in claim 1, characterized in that decantation zone is situated in the lower part of said contactor reactor.

4. A device as claimed in claim 1, characterized in that the separation means in the processing zone comprises at least one of the means selected from the group consisting of:

filtering means for producing at least fluid $F_1$ containing mainly solvent and nearly free of by-products, and at least fluid $F_2$ containing most of the by-products formed, and capture means for producing at least fluid $F_1$ containing mainly solvent and nearly free of by-products, and at least fluid $F_2$ containing most of the by products formed.

5. A device as claimed in claim 1, further comprising a line allowing to recycle at least part of the solvent from the processing stage to the contactor reactor.

6. A device as claimed in claim 1, characterized in that said contactor reactor is selected from the group consisting of a reactor with random or stacked packing, a static mixer SMV, an impactor, a hydro-ejector, an atomizer, and a wire contactor.

7. A device as claimed in claim 1, wherein said device is connected to a Claus plant processing $H_2S$ from natural gas scrubbing operation or crud oil refining operations, and said gaseous effluent is an effluent of the Claus plant.

8. A device as claimed in claim 1, characterized in that the heating means comprises means for heating the fluid F to a temperature between 120 and 150° C.

* * * * *